US008438723B2

(12) United States Patent
Reinman et al.

(10) Patent No.: US 8,438,723 B2
(45) Date of Patent: May 14, 2013

(54) ELECTROMAGNET BATTERY HANDLER

(76) Inventors: William A Reinman, Modesto, CA (US); Edward S. Heyman, Modesto, CA (US)

( * ) Notice: Subject to any disclaimer, the term of this patent is extended or adjusted under 35 U.S.C. 154(b) by 293 days.

(21) Appl. No.: 13/065,857

(22) Filed: Apr. 1, 2011

(65) Prior Publication Data

US 2012/0246918 A1 Oct. 4, 2012

(51) Int. Cl.
*B23P 19/00* (2006.01)

(52) U.S. Cl.
USPC .............................................. 29/763; 29/744

(58) Field of Classification Search .................... 29/763, 29/744, 810, 811.2; 401/126, 129; 606/1, 606/213
See application file for complete search history.

(56) References Cited

U.S. PATENT DOCUMENTS 5,704,674 A * 1/1998 Boozer ........................ 294/65.5
7,465,114 B2 * 12/2008 Kress et al. .................. 401/129
7,618,435 B2 * 11/2009 Opolski ........................ 606/213

* cited by examiner

*Primary Examiner* — Thiem Phan

(57) ABSTRACT

A device to transfer a tiny hearing aid battery to the battery compartment of a hearing aid. Pressure on a button at the top creates contact to a single AAA battery, thus energizing an electromagnet which then holds the hearing aid battery. When the pressure at the devices's top button is released, the AAA battery is turned off and the battery is released undisturbed in the hearing aid's battery compartment.

3 Claims, 1 Drawing Sheet

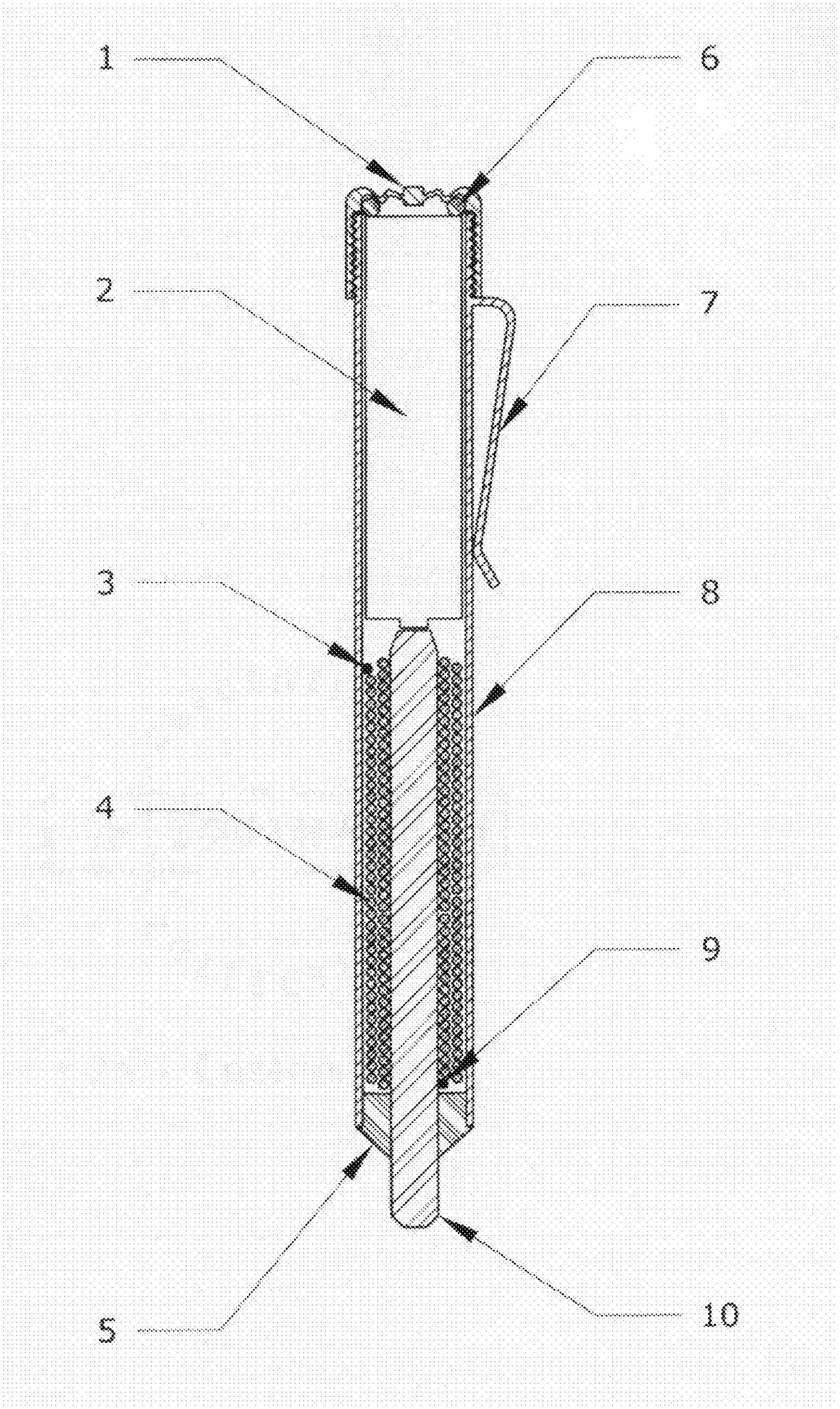
1
6
2
7
3
8
4
9
5
10

ELECTROMAGNET BATTERY HANDLER

BACKGROUND OF THE INVENTION

Small round shaped hearing aid batteries, sizes 10, 312, 13 and 675 are difficult for people to remove from packaging. Even young people with nimble fingers will fumble and frequently drop a hearing aid battery while trying to take one from a package or to pick it up when it is dropped.

Most people do not wear their hearing aids continuously. They remove them because hearing aids sometimes hurt their ears, or are merely annoying. Many people remove their hearing aids for periods during the day or night in order to preserve battery life. This is when the tiny batteries are dropped onto a table, the floor into rugs, or perhaps into a regular container the user keeps handy. It is then necessary to pick up a minuscule battery with two fingers, a feat not very easy, even for a young person. This physical handling of a battery can be required many times a day, for example when a hearing aid battery dies at an inconvenient time as in a restaurant, theater, visiting a friend, etc. The present invention makes replacing the dead hearing aid battery quick and simple.

DISCLOSURE OF THE INVENTION

One objective of the present inventive concept is the improved ease of handling of very small batteries like those used in hearing aids and other small devices. In one embodiment, the present invention is a tool similar in appearance to a ballpoint pen. The tool may include an electro-magnetic core powered by an internal battery, which is turned on by pressing a button on the top of the cap. This sends battery power to a small electromagnet providing power of sufficient strength to pull a tiny hearing aid battery from a plastic covered package. The electro magnet's core protrudes from the tool's housing slightly, akin to the tip of a pen. The user then moves the hearing aid battery to the hearing aid's receptacle and releases the pressure on the button. In one possible embodiment, the tool can then be pulled away from the hearing aid without disturbing the battery. A clip on the side can be used to attach the device to a pocket as a convenience to the user.

All embodiments of the present inventive concept provide a simple and easy to use means to perform and annoying frequently difficult chore, the physical handling of a tiny, round battery. The simplicity of its design creates ease of use.

In embodiments that use a small battery to power the electromagnet, the very small amount of electricity needed will not be harmful to any person who uses or attempts to play with the device. If a person turns it on and touches finger to the tip, it will not produce a sufficient charge to be felt. The invention is also safe because the small amount of electricity required only flows at the touch of the button and stops when the pressure on the button is released.

SUMMARY OF DRAWING

FIG. 1 depicts a cross-sectional view of one possible embodiment of the present inventive concept.

ELECTROMAGNET BATTERY HANDLER

Description of the Device, Its Parts and Their Functions

This pocket-sized electromagnet is used to move a hearing aid sized battery without having to touch (or drop) the tiny battery until it is in the proper position for inserting it into the hearing aid or any other device requiring these tiny batteries. The electromagnet is turned on by finger pressure on the cap that activates the electromagnet to pick up a battery. Releasing pressure on the cap turns off the electricity, which releases the battery.

1. CAP—acts as a retainer for the battery and as a momentary switch to activate or deactivate the electromagnet when the center of the metal cap is held in contact with the battery (2).
2. BATTERY—a standard AAA battery.
3. UPPER TERMINAL OF THE COIL—(4) bonded to the case (8) of the device.
4. COIL—made of insulated wire bonded to the core (10) at location (9).
5. PLASTIC RETAINER—for the forward end of the coil and the core (10).
6. O-RING—retainer for the battery to keep proper distance from the cap (1).
7. POCKET CLIP—to enable the device to be carried in a pocket.
8. CASE—a metal cylinder holding the parts.
9. LOWER TERMINAL OF THE COIL (4)—bonded to the core (10)
10. CORE—is a magnet only when the device is activated.

We claim:

1. A tool for removing and installing batteries in electronic devices comprising:

A cylindrical housing having a fore-and aft-end, and also having conduction means along said housing connecting a first point at the aft-end, and also having conduction means along said housing connecting a first point at the aft-end of the housing to a second point midway along the interior of said housing:

A steel core mounted lengthwise inside said housing and protruding from said housing's fore-end by a predetermined length:

An insulated wire coil wrapped around said core, bonded on one end to said second point midway along the interior of said housing and bonded on the other end to the core near the fore-end of the housing A power-source housed inside the aft portion of said housing, having a positive terminal and a negative terminal proximately disposed near the aft end of the housing:

An activation means disposed at the aft-end of said housing, said activation means connecting the negative terminal of said power source to the first point of said conducting means when in the "on" position.

2. The tool of claim 1 wherein the housing is composed of conducting material.

3. The tool of "claim 1" wherein the power source is a battery.

* * * * *